United States Patent [19]
Brachert et al.

[11] Patent Number: 5,934,769
[45] Date of Patent: Aug. 10, 1999

[54] SYSTEM FOR CONTROLLING BRAKE SYSTEMS

[75] Inventors: Jost Brachert, Ditzingen; Elmar Mueller, Markgroeningen, both of Germany

[73] Assignee: Robert Bosch GMBH, Stuttgarts, Germany

[21] Appl. No.: 08/816,163

[22] Filed: Mar. 12, 1997

[30] Foreign Application Priority Data

Mar. 30, 1996 [DE] Germany .................. 196 12 833

[51] Int. Cl.⁶ .................................................. B60T 8/64
[52] U.S. Cl. ......................................... 303/146; 303/188
[58] Field of Search .................. 303/146, 147, 303/148, 188, 187, 186, 169, 3, 15, 20; 701/72

[56] References Cited

U.S. PATENT DOCUMENTS

| | | | |
|---|---|---|---|
| 4,005,911 | 2/1977 | Klatt et al. ................. | 303/188 |
| 4,852,009 | 7/1989 | Jonner et al. ............... | 364/426.02 |
| 5,134,352 | 7/1992 | Matsumoto et al. .......... | 303/146 X |
| 5,315,518 | 5/1994 | Lin ........................... | 303/148 |
| 5,551,771 | 9/1996 | Akuzawa et al. ............ | 303/188 X |
| 5,733,019 | 3/1998 | Inagaki et al. .............. | 303/146 |

FOREIGN PATENT DOCUMENTS 3925828  8/1989  Germany .................. G01N 27/30

OTHER PUBLICATIONS van Zanten et al, "VDC, The Vehicle Dynamics Control System of Bosch", SAE Technical Paper Series, Feb. 1995, pp. 9–26.

*Primary Examiner*—Lee W. Young
*Attorney, Agent, or Firm*—Fulbright & Jaworski, LLP

[57] ABSTRACT

The system serves to control the brakes of at least two wheels of a vehicle, preferably mounted on the same axle. Means are provided for controlling the brake pressure at the so-called low wheel to prevent it from locking after it has been recognized that this wheel is showing a tendency to lock. In addition, detection means are provided for determining a variable which modifies and/or represents the driving dynamics of the vehicle. A corresponding threshold value is also derived for this variable. A comparison means is provided to compare the determined variable with the determined threshold value, and a comparison result is generated. Control means for controlling the brake system of the high wheel are provided, which, after it has been recognized that the low wheel is showing a tendency to lock, change the course of the brake pressure at the high wheel as a function of the determined comparison result.

12 Claims, 8 Drawing Sheets

SYSTEM FOR CONTROLLING BRAKE SYSTEMS

BACKGROUND OF THE INVENTION

The invention pertains to a system for controlling the brake systems of at least two wheels of a vehicle.

The state of the art offers many different methods for preventing the wheels from locking by intervening in the brake systems of the wheels. To do this, an instability criterion is usually derived from the deceleration and slip of the wheels. When the brake pressure is now controlled at the individual wheels in such a way that each wheel experiences the optimum deceleration independently of all of the other wheels, it is possible under so-called "$\mu$-split conditions" for the vehicle to spin. A $\mu$-split condition of this type is present when the vehicle is traveling on a surface such that the friction values on the right side of the vehicle are significantly different from those on the left. In this case the wheels which are moving on the part of the driving surface with the higher coefficient of friction are braked much more strongly than the wheels moving on the surface with the lower coefficient of friction. To prevent the vehicle from spinning in this case, a so-called "yaw moment buildup delay" is carried out, so that, in cases where the coefficients of friction of the driving surface are asymmetric, the difference in the braking force between the wheels of one axle of the vehicle does not become too pronounced. In principle, during the delay of the buildup in the yaw moment, the increase in pressure at the wheel most recently showing a tendency to lock, i.e., the so-called "high wheel", is limited when the other wheel, i.e., the so-called "low wheel", starts showing a tendency to lock. Various solutions for delaying the buildup of yaw moment like this are known. For example, when the low wheel is showing a tendency to lock, the pressure at the high wheel can continue to be built up but on a reduced gradient. It is also known that, in cases where the low wheel is showing a tendency to lock, the brake pressure at the high wheel can be kept constant until the brake pressure starts to build up again at the low wheel. It is known from U.S. Pat. No. 4,852,009 that, during travel around a curve, the increase in the brake pressure at the rear wheels is reduced when an instability occurs at the front wheel first showing a tendency to lock. The reduced pressure increase is selected as a function of the magnitude of the current transverse acceleration. In this way, the function of the yaw moment buildup delay is improved during travel around a curve. It is also known from DE-OS 39 25 828 that the difference between the brake pressure at the high wheel and that at the low wheel of one axle can be monitored, so that, as soon as a predetermined nominal pressure difference is exceeded, the brake pressure at the high wheel can be kept constant or reduced. This predetermined nominal pressure difference is varied as a function of the coefficient of friction at the low wheel.

In the SAE technical paper "VDC, The Vehicle Dynamics Control System of Bosch" Advancements in ABS/TCS and Brake Technology, SP-1075(1995) a system is presented in which essentially the angular yaw velocity of the vehicle is measured and compared with a nominal value derived from the longitudinal velocity of the vehicle and the steering angle. When the measured angular yaw velocity exceeds the corresponding nominal value, the yaw behavior of the vehicle can be modified and thus the driving stability increased by means of wheel-specific overbraking or underbraking.

The object of the present invention is to optimize the braking behavior under $\mu$-split conditions.

SUMMARY OF THE INVENTION

The system according to the invention serves to control the brake systems of at least two wheels of a vehicle, preferably mounted on the same axle of the vehicle. As already mentioned above, means are provided in the invention for controlling the brake pressure at the so-called "low wheel" to prevent it from locking as soon as it has been recognized that this wheel is starting to lock. In addition, detection means are also provided in the invention for determining a driving dynamics variable which modifies and/or represents the driving dynamics of the vehicle. A corresponding threshold value is also derived for this variable. By the use of a comparison means, the determined variable is compared with the determined threshold value, and a comparison result is generated. According to the invention, means for controlling the brake system of the high wheel are provided, which, after it has been recognized that the low wheel is showing a tendency to lock, adjust the brake pressure curve at the high wheel as a function of the generated comparison result.

The invention has the advantage that each wheel is able to make optimum use of the coefficient of friction, that is, the braking distance is minimized, without causing any significant impairment to the driving stability. Thanks to the invention, furthermore, the system can be easily adapted to different vehicles, because, through the definition of the above-mentioned threshold value, for example, the driving stability can be easily modified. An additional advantage of the invention is that the system mentioned above for delaying the buildup of yaw moment at, for example, the front axle, can be omitted. As a result of the invention, furthermore, additional help is provided while braking on curves, this being associated with shorter braking distances.

In an advantageous embodiment of the invention, it is provided that, to determine the driving dynamics variable, at least the yaw motion of the vehicle, preferably the angular yaw velocity, is detected. In this way, an instantaneous value is obtained directly as a driving dynamics variable for the motion of the vehicle, which is induced primarily by braking under $\mu$-split conditions.

It is especially advantageous to determine the threshold value for the driving dynamics variable at least as a function of the determined longitudinal velocity of the vehicle. An advantage is that, at relatively low vehicle speeds, driving stability has less priority over braking distance than at higher vehicle velocities. For this purpose the threshold value decreases with increasing longitudinal vehicle velocity.

To determine the driving dynamics variable, it is possible to detect the steering angle of the vehicle in addition to the angular yaw velocity. In particular, it is provided that a value is derived from the detected longitudinal velocity of the vehicle and from the detected steering angle, whereupon this value is compared with the actual angular yaw velocity of the vehicle. From this comparison, the driving dynamics variable mentioned is then derived.

The means for controlling the brake system of the high wheel are designed in such a way that, when the low wheel is showing a tendency to lock, the brake pressure is lowered at the high wheel when the determined driving dynamics variable exceeds the determined threshold. The brake pressure is built up at the high heel when the determined driving dynamics variable falls below the determined threshold.

It is especially advantageous that the degree to which the brake pressure is lowered and/or built up, e.g., the gradient at which the brake pressure is lowered and/or built up, at the high wheel is accomplished as a function of the determined comparison result. When, therefore, the driving dynamics variable exceeds the associated threshold by a considerable amount, the brake pressure at the high wheel will be decreased to a much greater extent than in the case where the deviation is less pronounced. Similarly, the buildup of brake pressure at the high wheel can be brought about much more quickly when the driving dynamics variable is significantly below its threshold.

In addition to the dependence of the increase and/or decrease in the brake pressure on the determined comparison result, it is especially advantageous for the increase and/or decrease in the brake pressure, e.g., the gradient of the increase and/or decrease in the brake pressure, to be selected as a function of the change over time in the determined comparison result.

It is advantageous for the brake pressure to be increased and/or decreased by means of predefinable pressure buildup and pressure release pulses, separated by predefinable pressure hold phases. The pressure hold phases can be specified as a function of the extent of the determined comparison result.

It can be provided here that in particular the duration of the pressure hold phases is specified as a function of the determined comparison result and/or as a function of the change over time in the determined comparison result.

DETAILED DESCRIPTION OF THE PREFERRED EMBODIMENTS

Figure 1A:
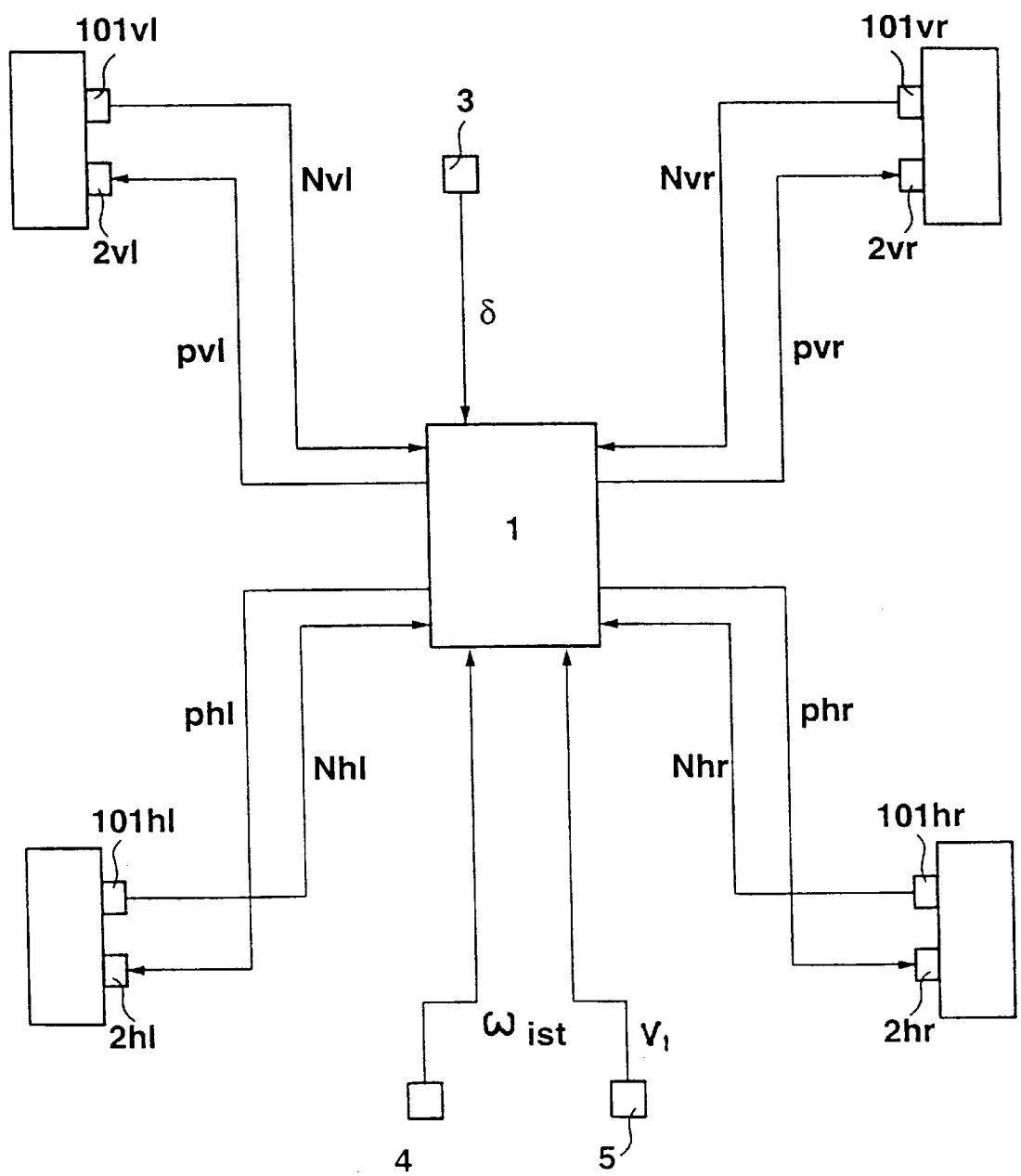
FIG. 1a is an overall block diagram of a brake system.

FIG. 1a shows a functional overall diagram of a known brake system. Four wheels are drawn, the rotational speeds $N_{ij}$ of which are detected by wheel speed sensors $101_{ij}$. The index "i" designates which axle the wheel is mounted on, i.e., either the front (i=v) or the rear (i=h) axle, whereas the index "j" designates which side of the vehicle the wheel is on, i.e., either the right side (j=r) or the left side (j=1). The wheel speed signals $N_{ij}$ are sent to a control unit 1. As a function of the wheel speed signals $N_{ij}$, actuation signals $p_{ij}$ for wheel brake systems $2_{ij}$ are formed in control unit 1. This is usually done by calculating an instability criterion as a function of the wheel deceleration and slip for each wheel. This instability criterion is then used to identify whether or not a wheel is starting to lock. If so, then by keeping the brake pressure constant or by lowering the brake pressure at this wheel, the tendency to lock can be corrected. In addition to wheel speed signals $N_{ij}$, the output signals of a steering angle sensor 3, i.e., the steering angle δ; the output of an angular yaw velocity sensor 4, i.e., the instantaneous angular yaw velocity $\omega_{ist}$; the output signal of longitudinal vehicle velocity sensor 5, i.e., the longitudinal velocity $V_1$ of the vehicle, are also transmitted to control unit 1. The longitudinal velocity $V_1$ of the vehicle can also be determined from the speeds of the wheels $N_{ij}$.

As already mentioned, the brake pressure in known antilock control systems is controlled at the rear axle according to the so-called "select low" principle for reasons of driving dynamics, especially for the sake of stabilizing the vehicle during μ-split braking. This means that the wheel brake pressure at the high wheel is selected as a function of the wheel brake pressure at the low wheel. This stabilizing effect, however, suffers from the disadvantage that the braking distance is increased as a result of the poor use which is made of the coefficient of friction at the high wheel. If now additional information for determining the rotation of the vehicle, such as its yaw velocity, is made available to the antilock control system by sensors 3 and 4 as seen in FIG. 1a, it becomes possible to change from the select-low principle to the so-called "individual control" of the rear wheels in conjunction with, for example, a vehicle model.

Figure 2:
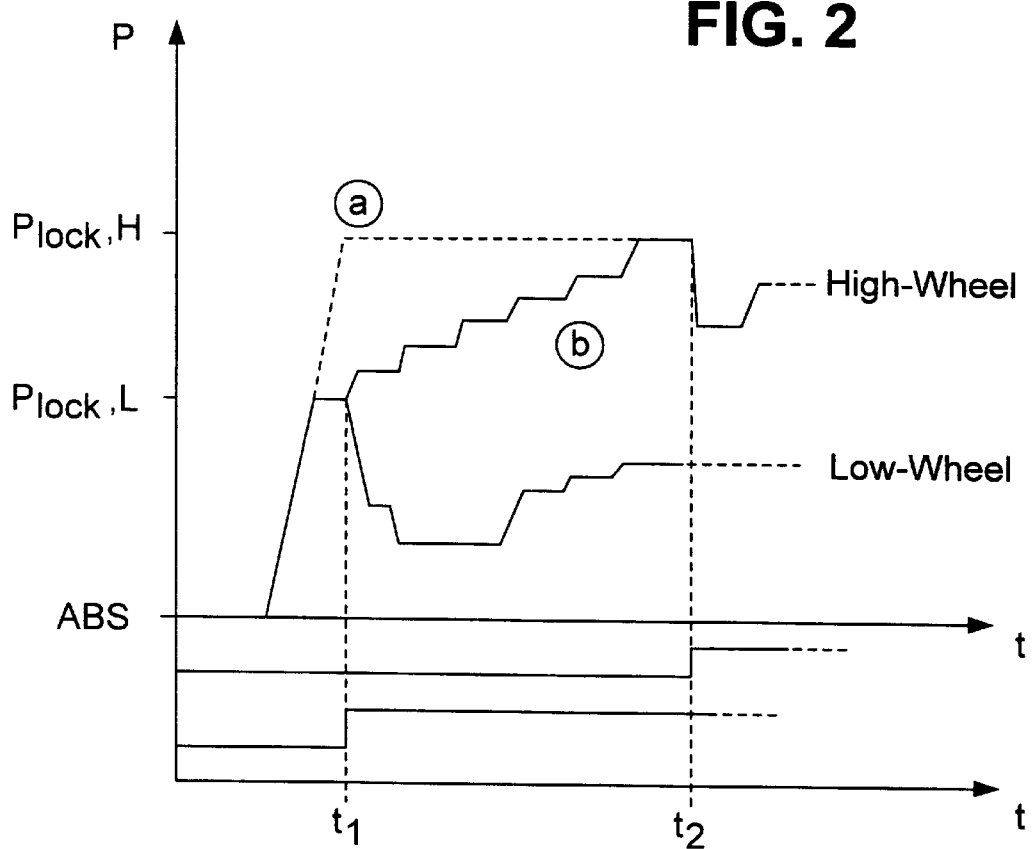
FIG. 2 is a plot showing the brake pressure over time for the high and low wheels.

FIG. 2 will now be used to present a brief explanation of this idea. In brakings on surfaces with an asymmetric distribution of the coefficients of friction (μ-split brakings), the brake locking pressures $P_{lock,H}$ and $P_{lock,L}$ on the high and low side are on different levels. Whereas the low wheel satisfies the criterion for the initiation of antilock control relatively soon after the start of braking (instability criterion), on the high side the corresponding locking pressure is not reached until later. This is shown in FIG. 2 by the "low wheel" curve and by curve a for the high wheel. For reasons of stability, the brake pressure at the high wheel is built up in pulses in the form of fixed pulse-pause sequences, beginning when the locking control starts on the low side (time $t_1$), as shown by curve b in FIG. 2. In this way, the high wheel does not arrive at its locking limit until time $t_2$.

Figure 1B:
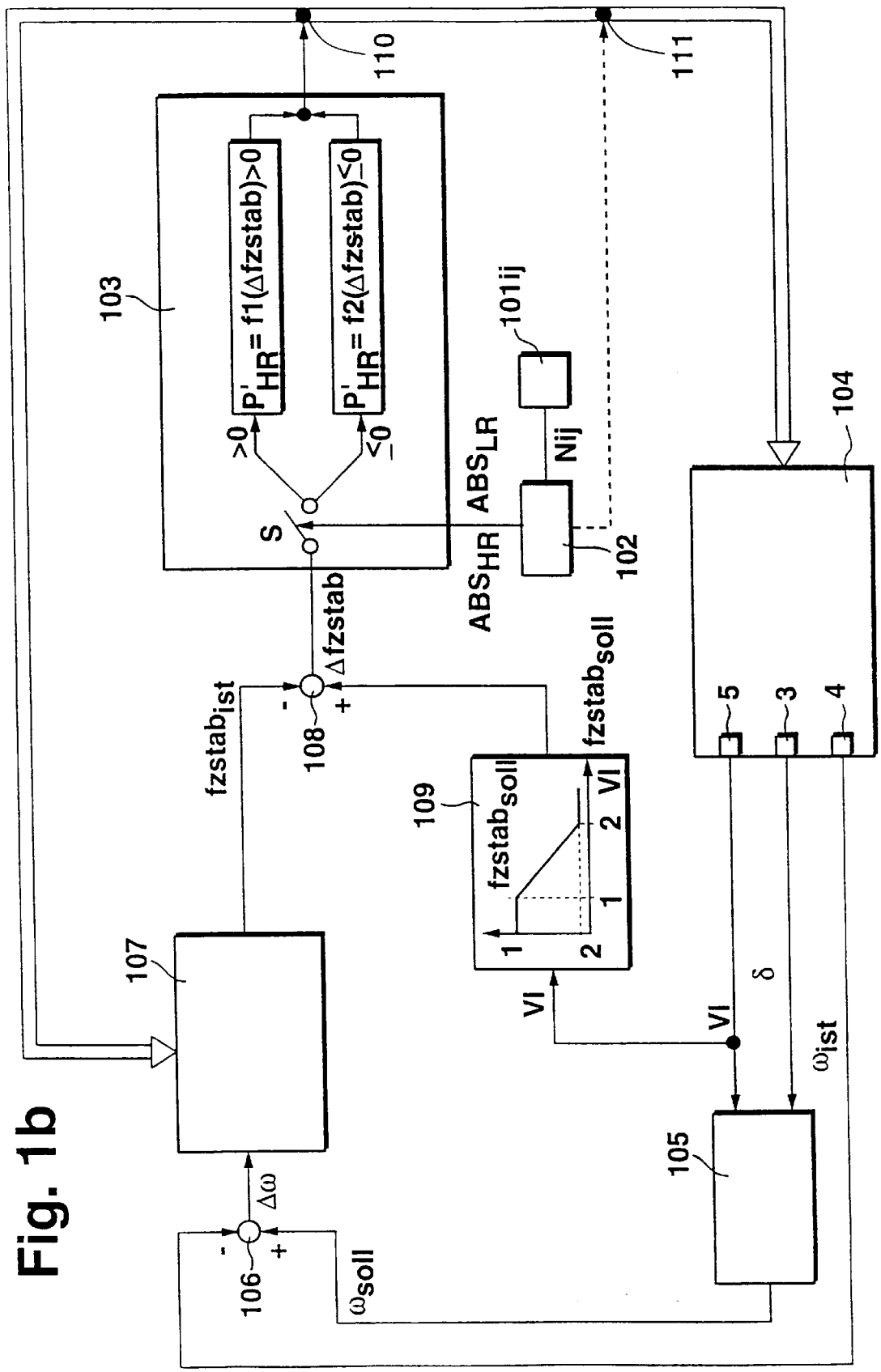
FIG. 1b is a block diagram of a first exemplary embodiment of the invention.

FIG. 1b shows the parts and functions of the control unit indicated by reference number 1 in FIG. 1a which are relevant to the present invention. A vehicle 104 includes the driver or the vehicle, and sensors 3, 4, 5 which detect the steering angle δ, the actual value of the yaw velocity $\omega_{ist}$, and the longitudinal velocity of the vehicle $V_1$. By means of the vehicle model stored in block 105, the nominal yaw velocity $\omega_{soll}$ is formed from the longitudinal velocity of the vehicle $V_1$ and the steering angle δ of the vehicle. This nominal yaw velocity represents a value for the angular yaw velocity which must be produced in order for the vehicle to go in the direction desired by the driver as the vehicle is driven around a curve at a certain velocity. In vehicle model 105, the behavior of the vehicle, that is, essentially the reaction of the vehicle to a steering angle induced by the driver at a certain longitudinal vehicle velocity, is stored in a manner known in itself.

At junction 106, the actual value $\omega_{ist}$ of the angular yaw velocity is compared with the nominal angular yaw velocity $\omega_{soll}$, whereupon the result of the comparison Δω is sent to a situation recognition unit 107. In situation recognition unit 107, the individual wheel brake pressures are then processed to derive a stability value $fzstab_{ist}$. A good measure for the stability of the vehicle can be determined as a function of how far the actual yaw velocity deviates from the nominal yaw velocity under consideration of the brake processes at the individual wheels. This stability value is compared at junction 108 with a corresponding nominal value $fzstab_{soll}$. This nominal stability value is formed in unit 109 as a function of the longitudinal velocity of the vehicle. The brake pressure at the high wheel is controlled in unit 103 as a function of the result of this comparison Δfzstab. This high wheel brake pressure, however, is controlled only when switch S is closed. Switch S is closed only when an ABS control process has been initiated at the low wheel of the axle and simultaneously the high wheel is operating stably. This ABS control occurs in a manner known in itself in unit 102 as a function of the wheel speed signals $N_{ij}$.

If switch S is closed, the brake pressure at the high wheel is then increased, decreased, or kept the same as a function of the sign of the result of the comparison Δfzstab. In particular, the brake pressure change $P_{HR}$ at the high wheel is selected as a function of the comparison result Δfzstab, as can be seen in block 103. In this regard, reference is be made to FIG. 5, yet to be described. The brake pressure determined in block 103 for the high wheel is adjusted accordingly, which is symbolized by feed 110. The wheel brake pressure at the low wheel, or, if switch S is open, at both wheels, is controlled by unit 102 in a manner known in itself by feed 111. As a result of the control of the brake pressures at the individual wheels, the driving dynamics of vehicle 104 are changed.

Figure 1C:
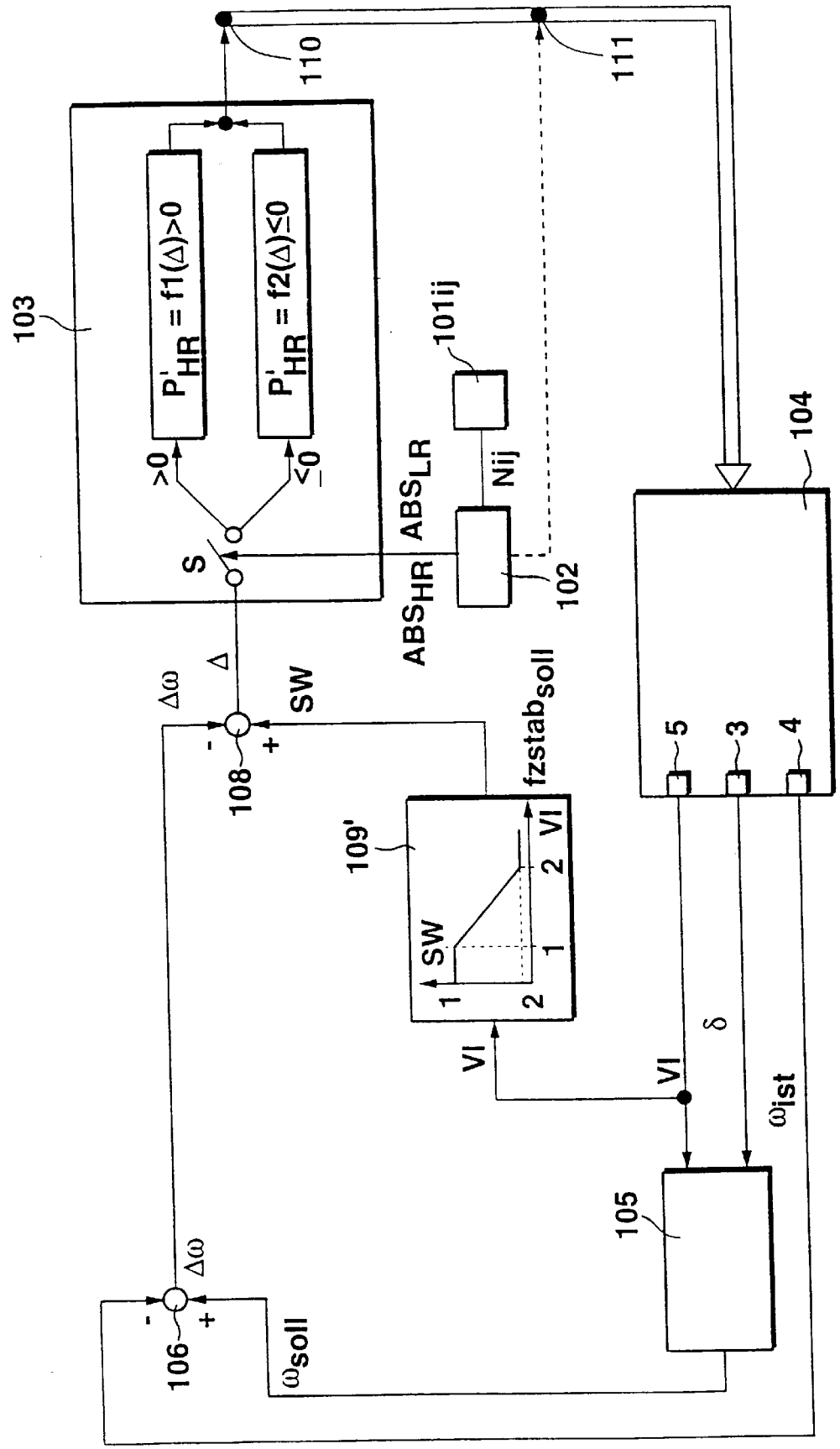
FIG. 1c is a block diagram of a second exemplary embodiment.

FIG. 1c shows another variant of the invention, where the blocks and signals which are the same as those of FIG. 1b are referred to by the same reference numbers. The only difference between the exemplary embodiment shown in FIG. 1b and that shown in FIG. 1c is that the deviation Δω between the nominal yaw velocity and the actual yaw velocity is sent directly to junction 108. The example shown in FIG. 1c thus does not require a situation recognition unit 107 and changes the brake pressure at the high wheel directly as a function of the comparison between the nominal and actual values of the yaw velocity.

To illustrate the way in which the exemplary embodiments work, parts a and b of FIG. 5 will be discussed in conjunction with FIG. 4. After the starting step 501, the program checks to see in step 502 whether or not a condition exists in which ABS control is in progress at the low wheel and simultaneously there is no ABS control in progress at the high wheel. For this purpose, as can be seen in FIGS. 1b and 1c, switch S is actuated by signals $ABS_{HR}$ and $ABS_{LR}$. If the condition tested in step 502 is not satisfied, then in step 507 a brake pressure buildup pulse or a time $T_{hold}$ for the brake pressure is determined. This case is shown in FIG. 4 in the period before time $t_1$ is reached.

Figure 4:
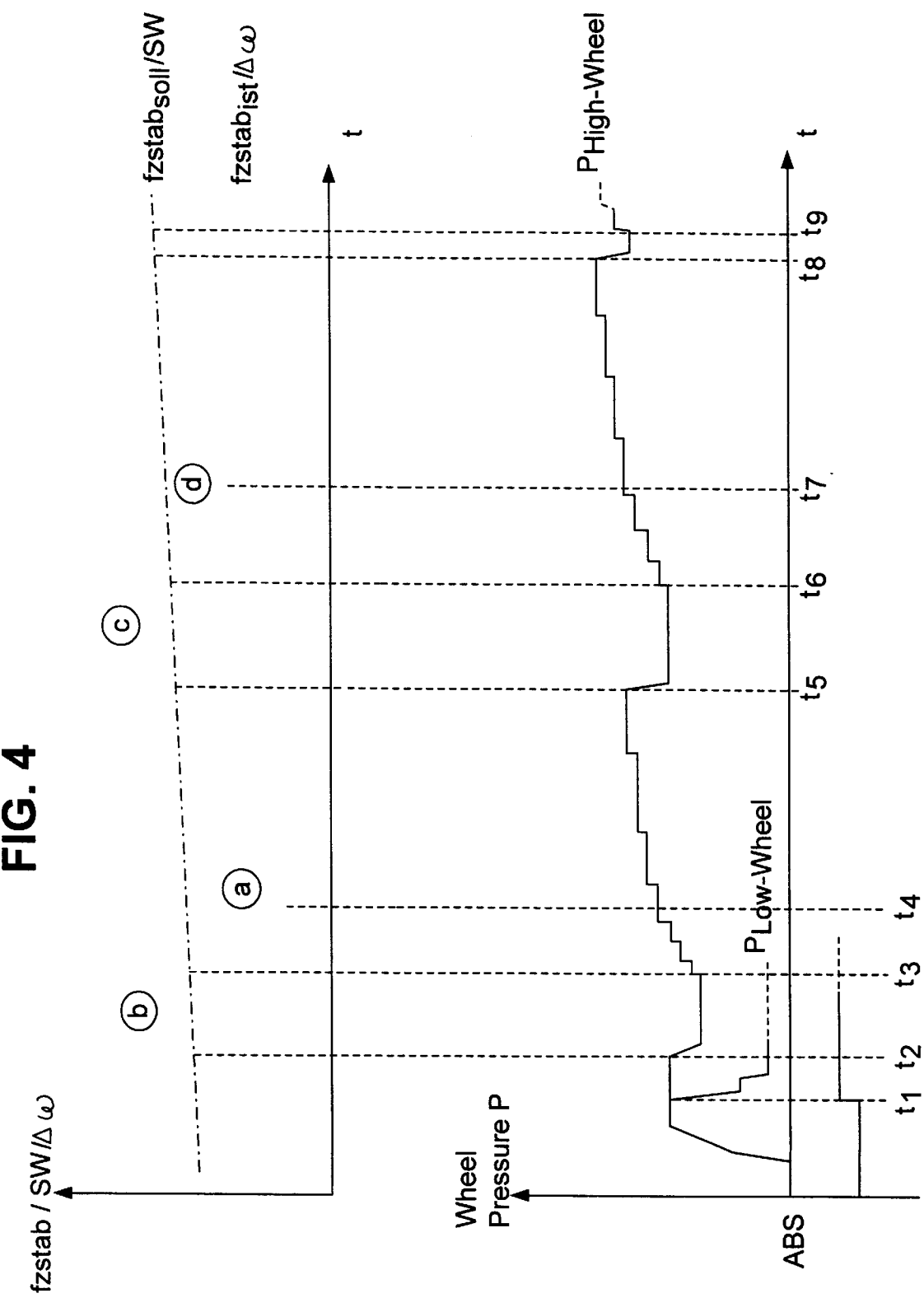
FIG. 4 is a plot showing the driving dynamics variable and the brake pressure for the high wheel overtime.

The top part of FIG. 4 shows the change over time in the nominal stability value fzstab$_{soll}$ (variant according to FIG. 1b) and the change over time in the threshold value SW (variant according to FIG. 1c). The upper part of FIG. 4 also shows the change over time in the stability value fzstab$_{ist}$ (variant according to FIG. 1b) and the change over time in the angular yaw velocity Δω (variant according to FIG. 1c). The bottom part of FIG. 4 shows the curves of the pressure at the high and low wheels; it is assumed here that pulse level control is used, that is, that the brake pressure at the wheels is built up and released in pulses.

Figure 5A:
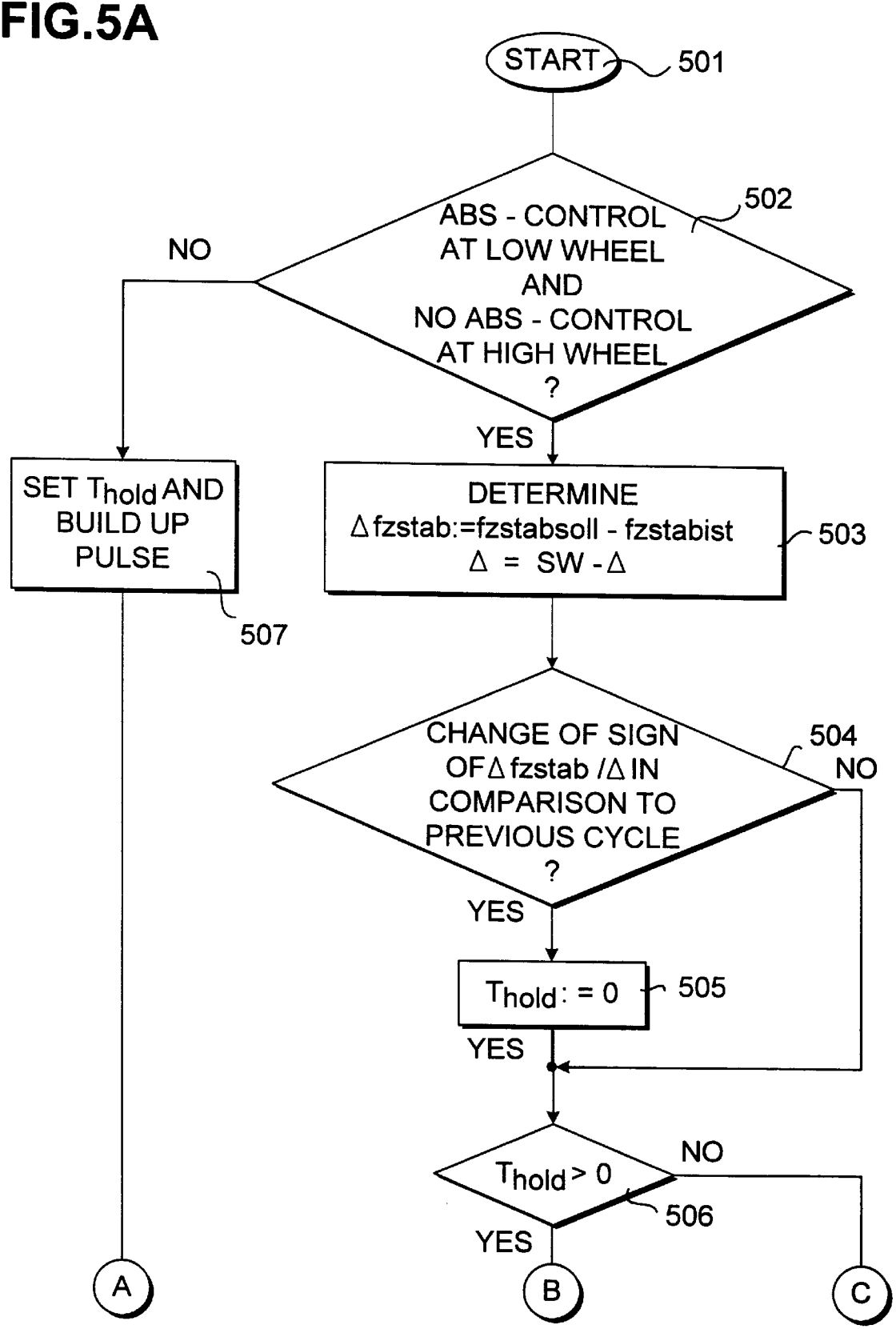
FIGS. 5a and 5b show the method steps according to an exemplary embodiment.
Figure 5B:
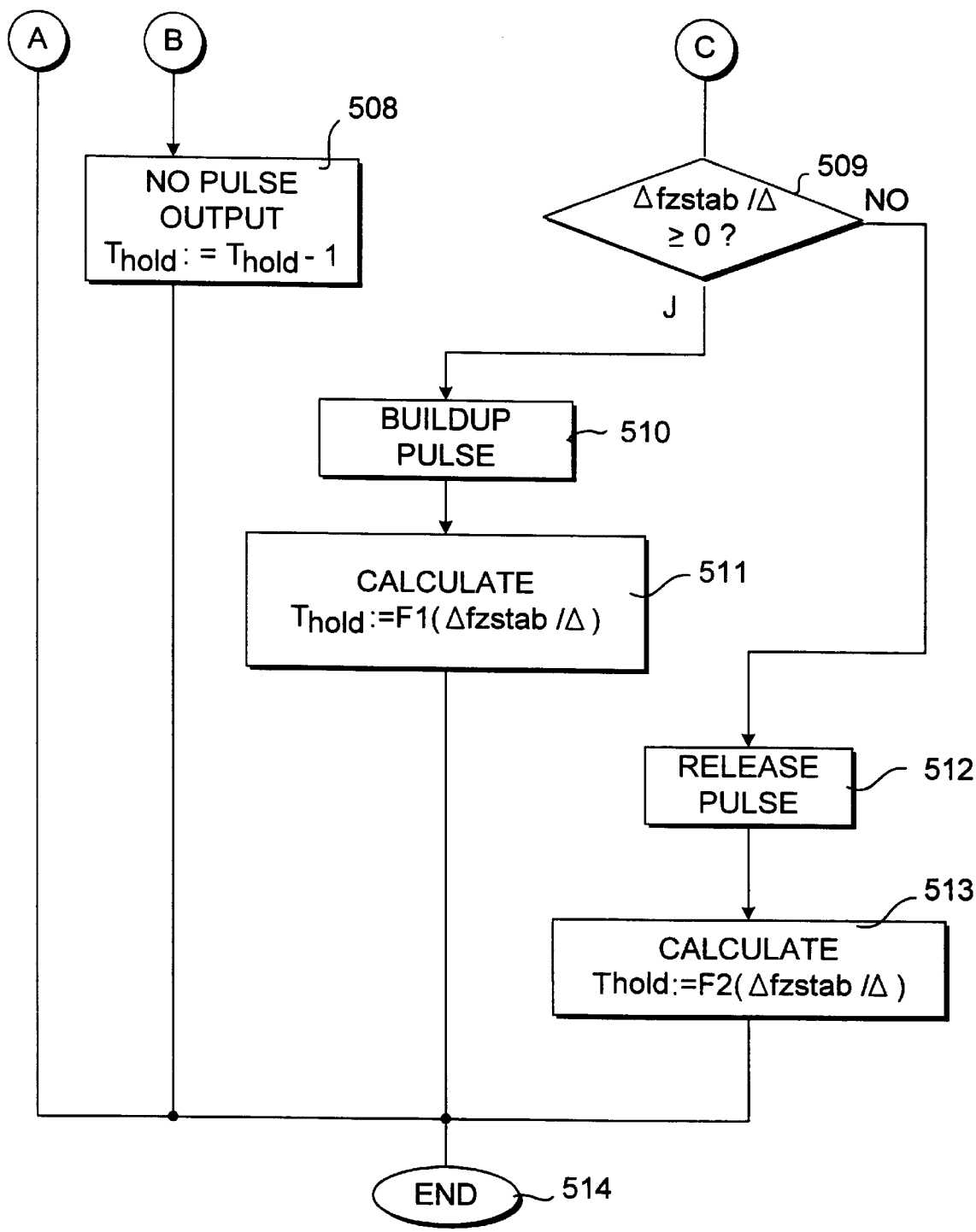

In previously described step 507 of FIG. 5a, therefore, in the case that no ABS control is in progress at the low wheel, the brake pressure at the high wheel is built up or maintained independently of the pressure at the low wheel (period of time before time $t_1$).

At time $t_1$ (FIG. 4), the low wheel arrives at its locking limit, whereupon the brake pressure, as can be seen in FIG. 4, is lowered. The high wheel at time $t_1$ is still below its locking threshold, whereupon the program proceeds from step 502 to step 503. In step 503, the difference between the nominal and the actual stability values (variant according to FIG. 1b) or the difference brake system the threshold value and the angular yaw velocity deviation (variant according to FIG. 1c) is calculated. The change over time in these values can be seen in the upper part of FIG. 4. In step 504, the program determines whether or not a sign change has occurred in the values determined in step 503 in comparison with the values determined during the previous cycle. A sign change such as this has occurred, for example, at time $t_2$ (FIG. 4).

Then, in step 505, the hold time $T_{hold}$ of the brake pressure is set to the value of zero. As can be seen in FIG. 4 at time $t_2$, this results in an immediate lowering of the brake pressure at the high wheel. If the values determined in step 503 do not change their sign (period between $t_1$ and $t_2$), then step 505 is bypassed, whereupon the brake pressure at the high wheel is kept constant for the remaining hold time $T_{hold}$ (brake pressure curve at the high wheel between times $t_1$ and $t_2$). In step 506, the program checks to see whether or not the hold time $T_{hold}$ is greater than zero. If, as was found in step 504, a change of sign has occurred, the hold time in step 505 was set to zero, whereupon, as a result of test 506, test 509 (FIG. 5b) is made immediately. In test 509, the sign of the values determined in step 503 is tested; that is, the program checks to see whether the nominal value is above or below the actual value.

If the actual value exceeds the nominal value, as it does at times $t_2$, $t_5$, and $t_8$ shown in FIG. 4, then in step 512 a new brake pressure release pulse is induced at the high wheel. After this release pulse, a new hold time $T_{hold}$ is calculated in step 513 as a function (function F2) of the deviation (Δ fzstab or Δ) found in step 503 or as a function of its change over time d/dt (Δ fzstab or Δ).

If the actual value is below the associated nominal value, as it is at times $t_3$, $t_6$, and $t_9$, then in step 510 a brake pressure buildup pulse is produced at the high wheel. Then, in step 511, a brake pressure hold time $T_{hold}$ is calculated as a function (function F1) of the value determined in step 503. Alternatively or in addition, it can also be provided that, in step 511, the brake pressure hold time $T_{hold}$ is calculated as a function of the change over time d/dt (Δfzstab or Δ). The functional relationship (function F1) between the hold time $T_{hold}$ and the difference Δfzstab between the nominal and actual instability value (variant according to FIG. 1b) or between the hold time $T_{hold}$ and the difference Δ between the threshold value and the angular yaw velocity deviation (variant according to FIG. 1c) is envisioned to consist in a proportional and especially in a differential component. The effect of using a proportional component is that, in the stable driving region (Δ fzstab or Δ≧0), the hold time $T_{hold}$ during a pressure buildup is shorter when the deviations Δfzstab or Δ are large than when the deviations Δfzstab or Δ are small. The increase in the brake pressure, i.e., the gradient of the pressure increase, is thus greater when the deviations Δfzstab or Δ are large than when the deviations Δfzstab or Δ are small.

As mentioned, it is especially advantageous to provide a differential component in function F1. The effect of this is that, in the stable driving region (Δfzstab or Δ≧0), the hold time $T_{hold}$ during a pressure buildup is shorter when the deviations Δfzstab or Δ are large than when the changes in the deviations Δfzstab or Δ are small. The increase in the brake pressure, change in the deviation Δfzstab or Δ is large than when the deviation Δfzstab or Δ is small.

The course of the pressure buildup gradients shown in FIG. 4 in the stable regions a and d (time spans between $t_3$ and $t_5$ and between $t_6$ and $t_8$, respectively) shows very clearly the differential component of function F1 mentioned above. Thus, shortly after times $t_3$ and $t_6$, we can see relatively large changes in the deviations Δfzstab and Δ, whereupon relatively short hold times and thus steeper pressure buildup gradients are selected. Starting at times $t_4$ and $t_7$, the hold times $T_{hold}$ are prolonged in view of the smaller changes in the deviations Δfzstab or Δ, which leads to a flatter pressure buildup gradient.

Figure 6:
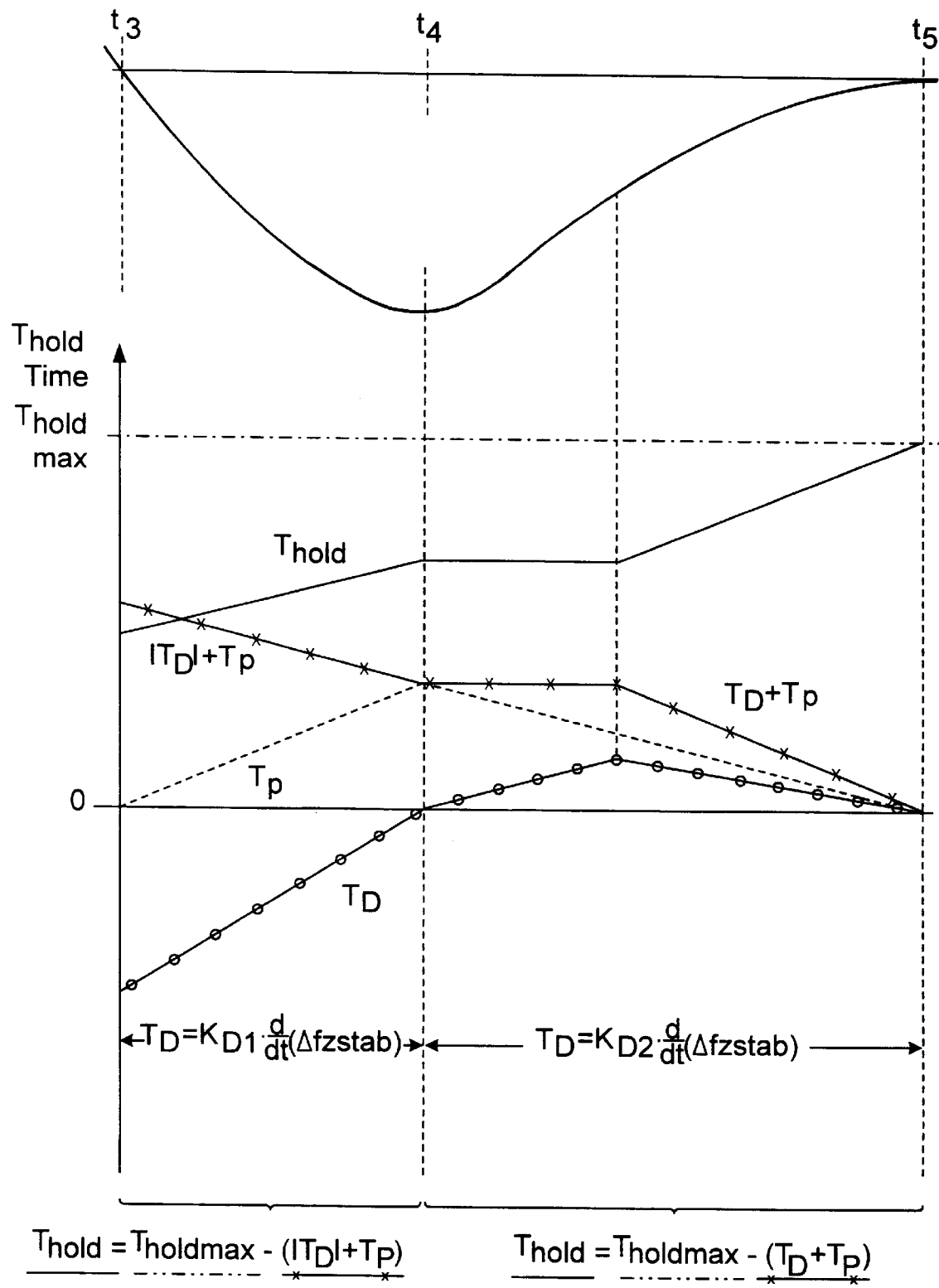
FIG. 6 shows how the brake pressure hold time is calculated.

FIG. 6 shows by way of example how the hold time $T_{hold}$ is calculated in region a (FIG. 4). The individual components, i.e., the proportional component $T_P$ and the differential component $T_D$, of the hold time $T_{hold}$ are shown in a highly linearized manner. The curve marked with circles represents here the differential component $T_D$ of the hold time $T_{hold}$, where:

$$T_D = (K_{D1} \text{ or } K_{D2}) * d/dt \, (\Delta \text{ fzstab or } \Delta)$$

This differential component $T_D$, together with the proportional component $T_P$ (curve in broken line), gives the brake pressure hold time $T_{hold}$ according to:

$$T_{hold} = T_{holdmax} - [|T_D| + T_P]$$

The value $T_{holdmax}$ represents here a maximum hold time.

If it is found in step 506 that the brake pressure hold time $T_{hold}$ at the high wheel is greater than zero, the brake pressure is neither built up nor released in step 508. Then, according to step 508, the value for the hold time $T_{hold}$ is reduced by one counter value (decremented). After final step 514, the sequence shown in FIG. 5a and 5b is started again.

Figure 3:
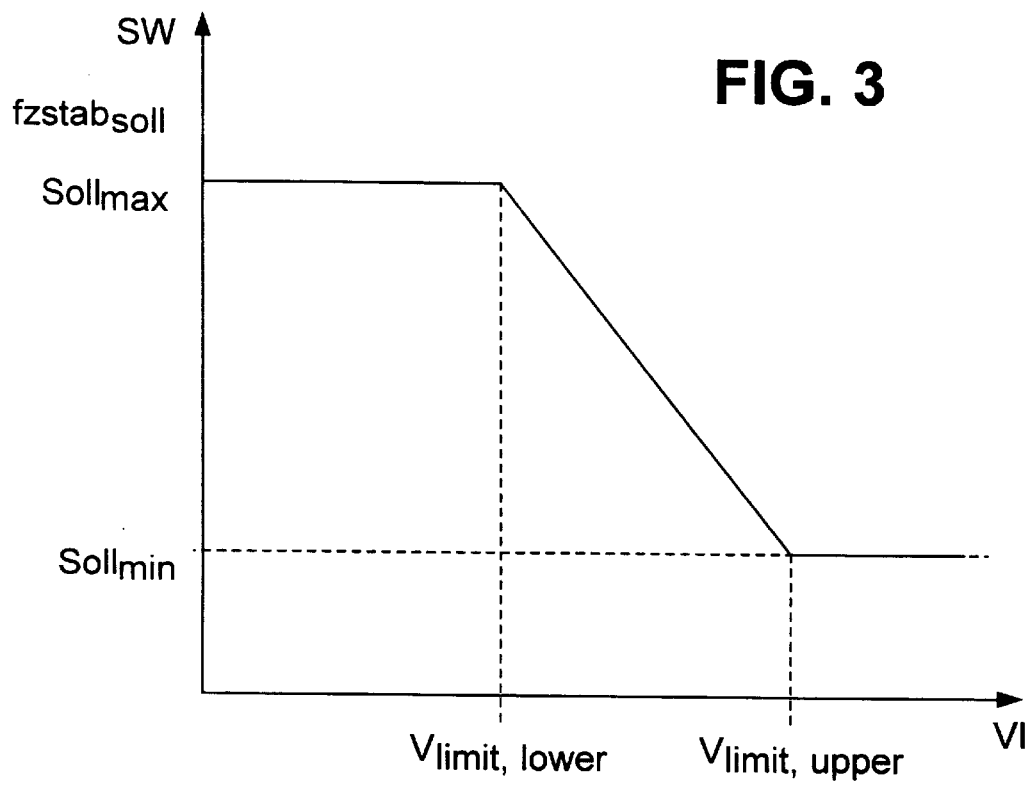
FIG. 3 shows the selection of the threshold value according to the invention.

FIG. 3 shows the dynamic systems behavior of blocks 109 (FIG. 1b) and 109' (FIG. 1c). The nominal stability value fzstab$_{soll}$ and the limit value SW between the two extreme values Soll$_{max}$ and Soll$_{min}$ are determined as a function of the longitudinal velocity of the vehicle $V_1$.

In summary, it can be said that, in conjunction with a driving dynamics control, especially with an expanded system of sensors for such a control, the pressure gradient at the high wheel can be adjusted very precisely to the instantaneously prevailing driving situation. The expanded system of sensors for driving dynamics control should include in particular an angular yaw velocity sensor and a steering angle sensor. As long as the driving dynamics controller recognizes stable driving conditions, the brake pressure is built up in the high wheel. The pressure gradient here depends on the current yawing motion of the vehicle; that is, it is proportional to the difference Δfzstab or Δ between the nominal stability value and the actual stability value and proportional to the change in the difference between the nominal stability value and the actual stability value. Large deviations or large changes in the stable region lead to steeper pressure buildup gradients, small deviations to correspondingly flatter pressure buildup gradients. This is shown by way of example in parts a and d of previously described FIG. 4.

If the actual driving dynamics value exceeds the specified nominal value (regions b and c, time spans between $t_2$ and $t_3$ and between $t_5$ and $t_6$, respectively), the pressure at the high wheel is reduced in proportion to this deviation or in proportion to the change in this deviation. At the end of this pressure reduction, either a pressure hold phase or a pressure buildup phase, depending on the course of the vehicle's motion, follows in the unstable region.

Special advantages are obtained when the nominal stability value fzstab$_{soll}$ or the limit value SW is formed as a function of the longitudinal velocity of the vehicle (FIG. 3). In this way it is achieved that, during braking at high initial velocities, smaller requirements are imposed on the driver, whereas, in the lower velocity range, much higher yaw velocities of the vehicle can be allowed. For example, the following values can be given:

maximum allowable nominal value SW:
   at $V_{limit,upper}$>200 km/h: 0.05 rad/s.
maximum allowable nominal value SW:
   at $V_{limit,lower}$<25 km/h: 0.20 rad/s.

We claim:

1. System for controlling brake system of at least two wheels of a vehicle, the wheels being mounted on at least one axle, said system comprising:

means for controlling brake pressure at one of said wheels identified as a low wheel to prevent said wheel from locking after said wheel has been recognized as showing a tendency to lock;

determination means for determining a variable which modified and/or presents the driving dynamics of the vehicle and for determining at least one threshold value;

comparison means for comparing the determined variable with at least the determined threshold value and for determining a comparison result; and control means for controlling the brake system of the other of said wheels identified as a high wheel in such a way that the brake pressure for said high wheel is varied over time as a function of the determined comparison result after it has been recognized that the low wheel is showing a tendency to lock wherein the threshold value is determined in such a way that this threshold decreases with increasing longitudinal vehicle velocity.

2. System according to claim 1, wherein to determine the variable which modified and/or represents the driving dynamics of the vehicle, at least the yawing motion of the vehicle is detected.

3. System according to claim 1, wherein the threshold value is determined at least as a function of a determined longitudinal velocity of the vehicle.

4. System according to claim 3, wherein the steering angle of the vehicle is also detected to determine the variable which modifies and/or represents the driving dynamics of the vehicle.

5. System according to claim 4, wherein to determine the variable which modifies and/or represents the driving dynamics of the vehicle, a value, derived from the detected longitudinal vehicle velocity and the detected steering angle, is compared with the value representing the angular yaw velocity of the vehicle.

6. The system according to claim 1, wherein the wheels are mounted on the same axle.

7. The system according to claim 2, wherein to determine the variable which modifies and/or represents the driving dynamics of the vehicle, the angular yaw velocity is detected.

8. The system according to claim 5, wherein said value derived from longitudinal or vehicle velocity and steering angle is derived by means of a vehicle model.

9. System for controlling brake system of at least two wheels of a vehicle, the wheels being mounted on at least one axle, said system comprising:

means for controlling brake pressure at one of said wheels identified as a low wheel to prevent said wheel from locking after said wheel has been recognized as showing a tendency to lock;

determination means for determining a variable which modified and/or presents the driving dynamics of the vehicle and for determining at least one threshold value;

comparison means for comparing the determined variable with at least the determined threshold value and for determining a comparison result; and control means for controlling the brake system of the other of said wheels identified as a high wheel in such a way that the brake pressure for said high wheel is varied over time as a function of the determined comparison result after it has been recognized that the low wheel is showing a tendency to lock, wherein, after it has been recognized that the low wheel is showing a tendency to lock, the control means controls the brake system of the high wheel in such a way that the brake pressure in the brake system of the the high wheel is reduced when the determined variable exceeds the determined threshold value and/or in such a way that the brake pressure is built up in the brake system of the high wheel when the determined variable falls below the determined threshold value.

10. System according to claim 9, wherein the extent to which the brake pressure is decreased and/or increased in the brake system of the high wheel is a function of the determined comparison result, where in particular the gradient at which the brake pressure is decreased and/or increased in selected as a function of the determined comparison result and/or as a function of the change over time in the determined comparison result.

11. System according to claim 9, wherein the brake pressure is reduced and/or built up in stages by means of predefinable pressure buildup and/or pressure release pulses separated by predefinable pressure hold phases.

12. System according to claim 11, wherein the pressure hold phases are specified as a function of the value of the determined comparison result, where in particular the duration of the pressure hold phases is selected as a function of the determined comparison result and/or as a function of the change over time in the determined comparison result.

* * * * *